United States Patent
Reeves et al.

(10) Patent No.: US 7,103,703 B1
(45) Date of Patent: Sep. 5, 2006

(54) BACK TO BACK CONNECTION OF PCI HOST BRIDGES ON A SINGLE PCI BUS

(75) Inventors: Richard W. Reeves, Westboro, MA (US); Austen John Hypher, Newton, MA (US); David John Workman, Westborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 261 days.

(21) Appl. No.: 10/865,836

(22) Filed: Jun. 14, 2004

(51) Int. Cl.
*G06F 13/00* (2006.01)
*G06F 13/42* (2006.01)

(52) U.S. Cl. .................. 710/312; 710/315; 713/400
(58) Field of Classification Search .............. None
See application file for complete search history.

(56) References Cited

U.S. PATENT DOCUMENTS

| | | | |
|---|---|---|---|
| 6,003,105 A * | 12/1999 | Vicard et al. | 710/314 |
| 6,128,691 A * | 10/2000 | Haren et al. | 710/260 |
| 7,016,994 B1 * | 3/2006 | Winkler et al. | 710/105 |
| 2004/0003161 A1 * | 1/2004 | Lee et al. | 710/305 |
| 2004/0151175 A1 * | 8/2004 | Moll et al. | 370/389 |
| 2004/0230709 A1 * | 11/2004 | Moll | 710/1 |

OTHER PUBLICATIONS

"HT7520 Data Book"; PLX Technology, Inc.; Jul. 2003.*
Hypertransport Technology Consortium, HyperTransport™ I/O Link Specification, Revision 2.00, pp. 27-76, 175-186, Feb. 9, 2003.
Advanced Micro Devices, Inc., "HyperTransport™ Technology I/O Link, A High-Bandwidth I/O Architecture", White Paper, pp. 1-25, Jul. 20, 2001.
"PCI Local Bus Specification", Revision 3.0, pp. 1-135, PCI-SIG, Feb. 3, 2004.
"PCI-X 2.0 Overview", pp. 1-40, PCI-SIG 10th Year Anniversary.
Advanced Micro Devices, Inc. "AMD-8131™ HyperTransport™ PCI-X® Tunnel Data Sheet", 24637 Rev. 3.02, pp. 1-87, Aug. 10, 2004.

* cited by examiner

*Primary Examiner*—Glenn A. Auve
(74) *Attorney, Agent, or Firm*—Manelli Denison & Selter PLLC; Leon R. Turkevich

(57) ABSTRACT

Duplicate PCI bridge devices are configured for synchronous initializations based on shared initialization signals. A first of the PCI bridge devices is configured to rely on bus arbitration performed by the second PCI bridge device. The first PCI bridge device also is configured for modifying an address of a data transaction received via a PCI bus, and forwarding the data transaction with the modified address to the second PCI bridge device via a link distinct from the PCI bus.

14 Claims, 5 Drawing Sheets

BACK TO BACK CONNECTION OF PCI HOST BRIDGES ON A SINGLE PCI BUS

BACKGROUND OF THE INVENTION

1. Field of the Invention

The present invention relates to integrated network devices having Peripheral Component Interconnect (PCI) bridges.

2. Background Art

Peripheral Component Interconnect (PCI) interfaces have been used to provide high-speed connectivity between devices in a multi-device system, such as a processor based system such as a personal computer.

FIG. 1 is a diagram illustrating a conventional implementation of a PCI bus system architecture 100. The system 100 includes a processor 102 coupled to a memory controller 104 via a local bus 106. The processor 102 and the memory controller 104 are coupled to a PCI local bus 106 (labeled PCI Local Bus #0) via a host bridge 108.

The host bridge 108 provides a low latency path through which the processor 102 may directly access PCI devices 110, for example a network interface card 110a providing access to a local area network, a disc drive (SCSI) controller 110b providing access to disk drives 114, an audio card 110c, a motion picture card 110d, or a graphics card 110e configured for driving a monitor 116. The host bridge 108 also provides a high bandwidth path allowing PCI masters on the PCI bus 106 direct access to the system memory 118 via the memory controller 104. A cache memory 120 is independent of the system memory 118 for use by the processor 102.

The term "host bridge" refers to the bridge device 108 that provides access to the system memory 118 for the devices 110 connected to the PCI bus 106. A PCI-to-PCI bridge 122 also may be used to connect a second PCI bus 124 to the PCI bus 106, the second PCI bus 124 configured for connecting other I/O devices 126.

Newer PCI bus protocols are being published, including PCI-X Mode 2, that provide enhanced PCI functionality. These newer PCI bus protocols include the PCI Local Bus Specification, Rev 2.3, the PCI-X Protocol Addendum to the PCI Local Bus Specification, Rev. 2.0a, and the PCI-to-PCI Bridge Architecture Specification, Rev 1.2.

A particular problem encountered during development of new devices that implement the newer PCI bus protocols is the availability of a PCI device having the capabilities of testing the newer PCI bus protocols. For example, development of the host bridge device 108 for use on the PCI bus 106 requires another device 110 or 122 capable of responding to the newer commands specified by the newer PCI bus protocols. Absent the availability of any other device 110 or 122 that implements the newer standard, one may desire to use a duplicate device 108 as a second PCI device (110 or 122) on the PCI bus 108, where the device under test 108 is used as the host bridge and the duplicate device is used as a PCI/PCI-X device 110 or 112.

However, according to the above-described PCI bus specifications, the PCI bus 106 is designed to have a single host device 108 on the PCI bus 106, and all the remaining devices 110 and 122 on the PCI bus 106 are expected to be subservient to the host device 108.

Hence, adding a second bridge device 108 for use as a PCI/PCI-X device 122 for testing and evaluation introduces several conflict issues between the duplicate devices 108 and 122. For example, each bridge device (e.g., 108 and 122) may assume it is the central resource responsible for generating clock signals, reset signals, and initialization patterns on the PCI bus 106. Further, each host bridge (e.g., 108 and 122) may assume that it is the PCI/PCI-X arbiter, creating arbitration conflicts. Finally, address mapping conflicts may occur if both PCI/PCI-X host bridges 108 and 122 are coupled to the same memory system 104 and 118.

SUMMARY OF THE INVENTION

There is a need for an arrangement that enables duplicate PCI bridge devices to be connected to a PCI bus for conflict-free testing of the devices.

These and other needs are attained by the present invention, where duplicate PCI bridge devices are configured for synchronous initializations based on shared initialization signals. A first of the PCI bridge devices is configured to rely on bus arbitration performed by the second PCI bridge device. The first PCI bridge device also is configured for modifying an address of a data transaction received via a PCI bus, and forwarding the data transaction with the modified address to the second PCI bridge device via a link distinct from the PCI bus.

One aspect of the present invention provides a method in an integrated PCI bridge device coupled to a PCI bus. The method includes initiating configurations in the integrated PCI bridge device, synchronously with a second integrated PCI bridge device coupled to the PCI bus, based on signals electrically connected between the integrated PCI bridge device and the second integrated PCI bridge device. The signals electrically connected including a shared clock signal. The method also includes receiving a data transaction from the PCI bus, based on PCI bus arbitration performed by the second integrated PCI bridge device, and modifying a destination address specified in the data transaction to a modified address. The method also includes outputting the data transaction having the modified address to the second integrated PCI bridge device via a link distinct from the PCI bus.

Another aspect of the present invention provides a system comprising first and second integrated PCI bridge devices, and a connector cable. The first integrated PCI bridge device is configured for outputting data, having been received from a host via an upstream link according to a prescribed link protocol, onto a PCI bus according to a PCI protocol. The PCI protocol is selected by the first integrated PCI bridge device based on having detected a shared PCI configuration signal, and based on a shared clock signal. The connector cable is configured for supplying a second link and the shared clock signal. The second integrated PCI bridge device is configured for receiving the second link according to the prescribed link protocol and the shared clock signal from the connector cable and configured for receiving the data from the PCI bus according to the PCI protocol, the second integrated PCI bridge device having selected the PCI protocol based on having detected the shared PCI configuration signal. The second integrated PCI bridge device further is configured to rely on PCI bus arbitration performed by the first integrated PCI bridge device. The first and second integrated PCI bridge devices are configured for synchronously initiating respective configurations based on the shared clock signal, and signals electrically connected between the upstream link and the second link.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

The disclosed embodiment of the arrangement for providing back-to-back PCI connections will be described in detail following an overview of the architecture of the HyperTransport™ tunnel/PCI-X bridge.

Architecture Overview

Figure 2:
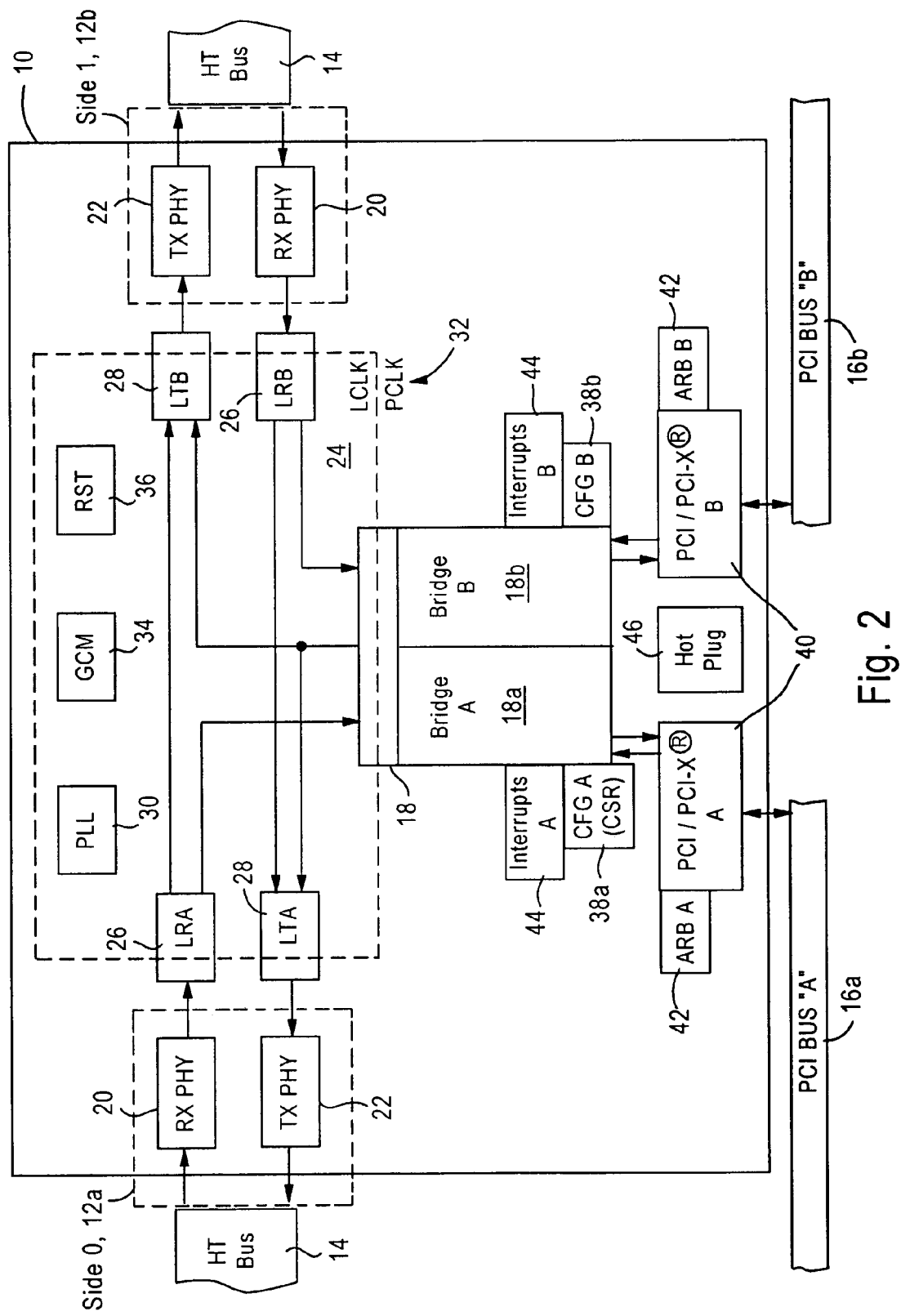
FIG. 2 is a diagram of a PCI host bridge device according to an embodiment of the present invention.

FIG. 2 is a diagram illustrating the transport tunnel-to-PCI host bridge device 10, according to an embodiment of the present invention. The transport tunnel-to-PCI host bridge device 10, preferably implemented as an integrated circuit on a single chip, is configured for operating as a HyperTransport™ (HT) tunnel device according to the HyperTransport™ 10 Link Specification, Rev. 2.0, including errata up to specification Rev. 1.05c.

The transport tunnel-to-PCI host bridge device 10 includes two HT interfaces 12a and 12b labeled "Side 0" and "Side 1", respectively. HT packets received by a given interface (e.g., 12a) from an HT bus 14 can be passed through the device 10 to the other interface (e.g., 12b) (i.e., tunneled), enabling multiple HT tunnel devices to be connected serially (e.g., a daisy-chain arrangement) to form an HT chain on the bus 14 for transfer of HT packets.

The following nomenclature may assist in describing connections in serially connected HT tunnel devices. The HT interface (e.g., 12a) that is connected to (or toward) a HyperTransport™ host device (e.g., a host memory controller) is referred to as the "upstream" interface, and the other HT interface (e.g., 12b) is referred to as the "downstream" interface: if the upstream interface (e.g., 12a) is directly connected to the HyperTransport™ host device via the corresponding connected HT tunnel 14, then that tunnel connecting the upstream interface to the HyperTransport™ host device is referred to as the "upstream link"; if the upstream interface (e.g., 12a) is connected to a second HT device via an HT tunnel, where the second HT device provides a connection to (or toward) the HyperTransport™ host device, then that HT tunnel connecting the upstream interface and the second HT device is referred to as the "upstream tunnel". Note that the downstream interface may or may not be connected to another HT device or chain of devices.

The transport tunnel-to-PCI host bridge device 10 also provides bridging operations between the HT bus 14 and PCI buses 16a and/or 16b. In particular, the transport tunnel-to-PCI host bridge device 10 contains two independent HT-to-PCI-X bridges 18a and 18b in accordance with the HyperTransport™ Link Specification, Rev. 2.0, the PCI Local Bus Specification, Rev 2.3, the PCI-X Protocol Addendum to the PCI Local Bus Specification, Rev. 2.0a, and the PCI-to-PCI Bridge Architecture Specification, Rev 1.2. The transport tunnel-to-PCI host bridge device 10 includes configurable registers (38a, 38b) that identify the address ranges utilized by each of the PCI bus 16a, the PCI bus 16b, and the HT bus 14.

Also note that the device 10 may identify a destination for a received HT packet based on a device identifier and bus identifier specified in the HT packet; alternately the device 10 may be configured to identify a destination bridge (e.g., 18a, 18b) based on a corresponding unit identifier (e.g., 181, 182) according to HyperTransport™ protocol. In addition, the transport tunnel-to-PCI host bridge device 10 includes configuration (CFG) registers 38a, 38b: the configuration register 38a includes command and status registers (CSRs) within prescribed address spaces used by the transport tunnel-to-PCI host bridge device 10 for internal configuration, in accordance with the above-described PCI and HyperTransport™ specifications. Hence, the transport tunnel-to-PCI host bridge device 10 can store configuration information to an addressable CSR based on identifying an HT packet specifying a device identifier for the device 10.

Hence, the transport tunnel-to-PCI host bridge device 10 can either tunnel HT packets received from the HT bus 14 by passing the packets from one interface (e.g., 12a) to the other interface (e.g., 12b), or the transport tunnel-to-PCI host bridge device 10 can pass the HT packets to one of the PCI buses 16a or 16b via the corresponding bridge 18a or 18b. Also note that the transport tunnel-to-PCI host bridge device 10 can process and respond to a received HT packet that is destined for the transport tunnel-to-PCI host bridge device 10 (e.g., for storage of configuration data).

The bridges 18a and 18b of the transport tunnel-to-PCI host bridge device 10 also forward onto the HT bus 14 any data having been received from the respective PCI buses 16a or 16b that specify a destination address within the prescribed address range specified within the CSRs for the HT bus 14.

Each of the HT interfaces 12a and 12b includes a receive physical layer transceiver (RX PHY) 20 and a transmit physical layer transceiver (TX PHY) 22. Each of the PHYs 20 and 22 include synchronization First-in-First-out (FIFO) registers for buffering packets according to a prescribed HT clock domain, and compensation circuitry to ensure electrical compliance with the HyperTransport™ specification. In particular, the RX PHY receives a packet and a clock associated with the packet according to the HT clock domain on the bus 14; the FIFO registers in the PHYs 20 and 22 are used to transition between the HT clock domain and a local clock (LCLK) domain 24.

The device 10 includes a local clock (LCLK) domain 24 that relies on a clock that is independent of any variations in clocks driven by the HT bus 14. The device 10 includes, within the local clock domain 24, receive logic 26 and transmit logic 28 for each of the HT interfaces 12 and 12b.

The device also includes a phase locked loop (PLL) circuit 30 configured for generating the local clock (LCLK) and a phase-controlled clock (PCLK) 32, and maintaining synchronization of those clocks as needed.

The receive logic 26 is configured for determining whether a received HT packet from the HT bus 14 should be forwarded to the corresponding transmit logic 28 for tunneling of the HT packet, whether the received HT packet should be forwarded to the bridge 18 for internal configuration of the device 10, or forwarded to the bridge 18 for transfer of the received HT packet onto a determined one of the PCI buses 16a or 16b.

The device 10 also includes within the local clock domain a link interface cycle manager (GCM) 34. The GCM 34 is configured for arbitrating the order of transactions that are to occur within the local clock domain 24. For example, the GCM 34 may arbitrate between transactions that are to be output by the transmit logic (LTA) 28. The reset logic (RST) 36 is configured for managing reset and device initialization operations, including implementing test and diagnostic modes.

The HT-to-PCI bridge 18 is configured for transferring HT packets, forwarded from the HT bus 14 by one of the receive logic blocks (e.g., LRA or LRB) 26, to one of the PCI buses 16a or 16b. In particular, the receive logic block 26 having received the HT packet will specify to the bridge 18 the PCI bus (e.g., 16a) on which the HT packet is to be output. The HT-to-PCI bridge 18 also is configured for transferring packets from one of the PCI buses 16a or 16b to one of the transmit logic blocks (e.g., LTA or LTB) 28 for output onto the HT bus 14. The bridge 18 (e.g., the bridge 18a) identifies the destination address of the HT packet as falling within the address range of either the PCI bus (e.g., 16a) or the configuration space of the configuration register (e.g., 38a), and forwards the packet accordingly.

The device 10 also includes, for each PCI bus (e.g., 16a, 16b), a bridge 18a and 18b, the configuration registers 38a and 38b, a PCI interface module 40, a PCI arbitration module 42, and an interrupt controller 44. The device 10 also includes a hot plug module 46. The configuration registers 38a and 38b include registers, addressable via the HT bus 14, for configuration of the respective components associated with bus operations for the respective PCI buses 16a and 16b. Each PCI interface module 40 is configured for transmitting and receiving PCI data bursts according to the above-identified PCI specifications. Each PCI arbitration module 42 is configured for managing PCI bus arbitrations for the corresponding attached PCI bus (e.g., 16a or 16b), including identifying a bus master for PCI bus transactions. Each interrupt controller 44 is configured for servicing interrupts detected on the corresponding PCI bus (e.g., 16a or 16b), as well as software-based interrupts generated according to prescribed I/O Advanced Programmable Interrupt Controller (IOAPIC) specifications. Hence, various interrupt methods may be implemented in the interrupt controllers 44.

The hot plug module 46 is configured for managing hot plug operations based on prescribed configuration registers in the registers 38a and/or 38b, where a selected PCI slot or device can be powered down while the device 10, as well as other PCI devices on the PCI bus, remain in a powered state. For example, the hot plug module 46 may include logic that is compliant with the Standard Hot Plug Circuitry (SHPC) specified in the above-described PCI specifications; alternative implementations also may be included in the hot plug module 46, for example logic configured for interfacing with commercially-available power controllers, including the TPS2340A or the TPS2342 power controllers commercially available from Texas Instruments, Inc.

Interconnecting PCI Host Bridges for Testing

Figure 1:
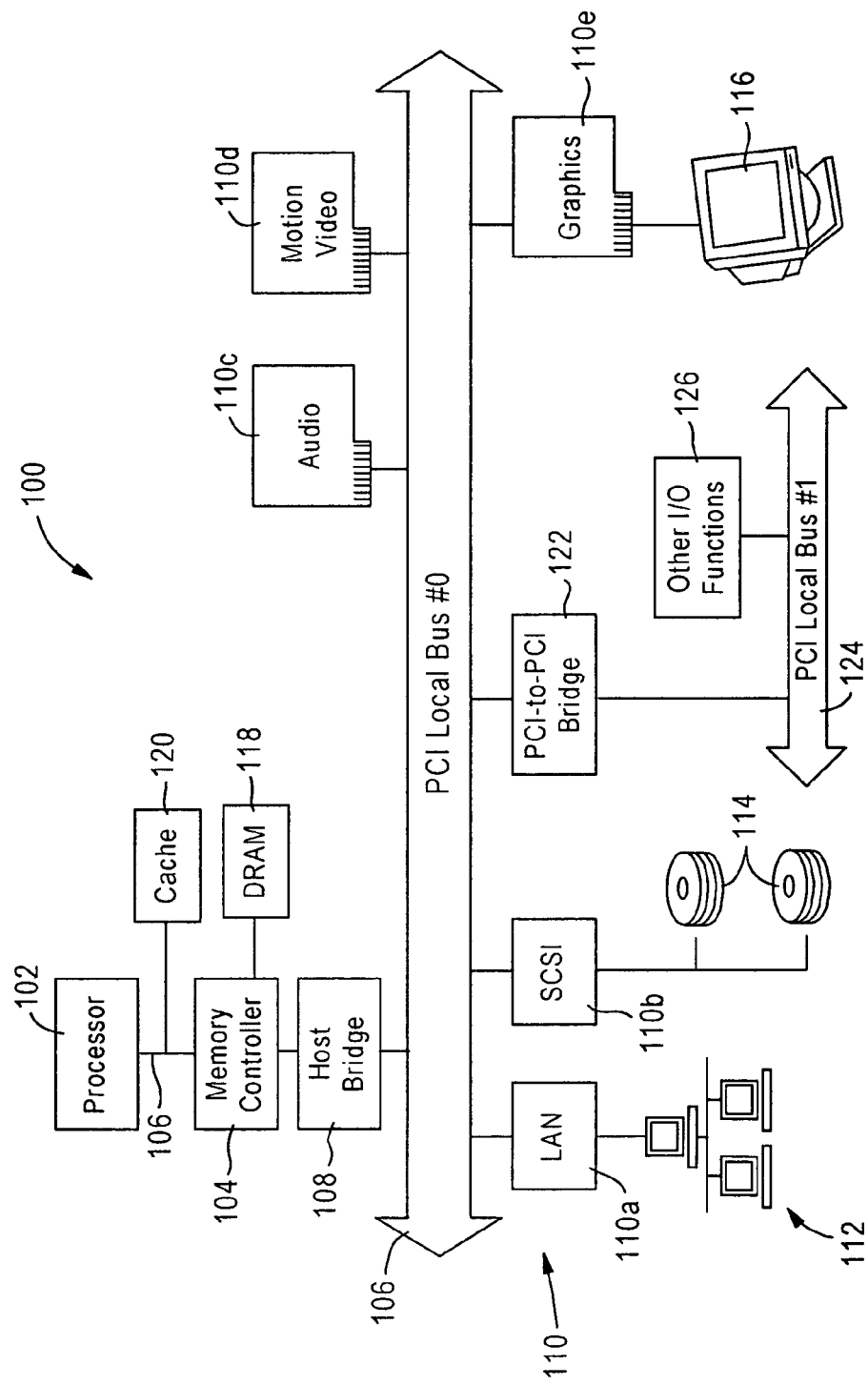
FIG. 1 is a block diagram of a conventional (PRIOR ART) implementation of a PCI based system.
Figure 3:
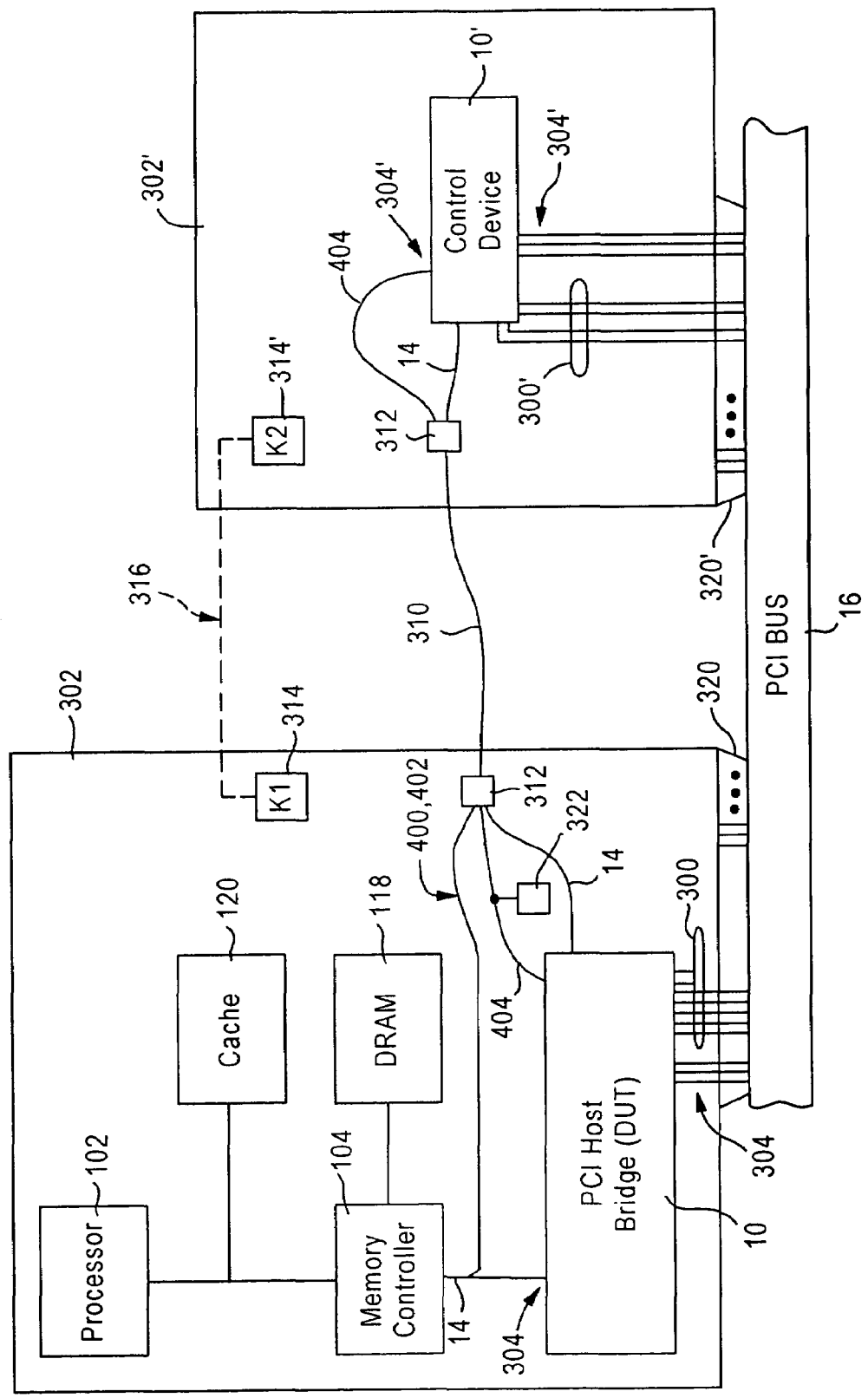
FIG. 3 is a diagram illustrating a system for testing the PCI host bridge device of FIG. 2, according to an embodiment of the present invention.

FIG. 3 is a diagram illustrating a system for testing the host bridge device 10 (i.e., Device under Test) (DUT), using a second duplicate device 10' (i.e., Control Device), according to an embodiment of the present invention. As described above, the PCI bus 16 is designed to have a single host device on the PCI bus. As illustrated in FIG. 1, the host bridge 108 is expected to be the single host device on the PCI bus 106, and in FIG. 3 the device 10 is expected to be the single host device on the PCI bus 16.

For example, the PCI buses 16 and 106 are configured such that prescribed operations (e.g., arbitration, pull-up, etc.) are to be performed by a single resource, as opposed to multiple resources on the same bus. The term "host bridge" refers to the bridge device (e.g., bridge 108 in FIG. 1 or bridge 10 in FIG. 3) that provides access to the system memory 118 for the devices connected to the PCI bus 16 (or 106 in FIG. 1).

It should be noted that, according to the HyperTransport™ specification, multiple HyperTransport™ devices on the same HT chain need not be synchronized due to the clock forwarding nature of the HT bus 14. In contrast, PCI devices need to receive a clock from a central resource for synchronized operations. The default configuration of the device 10, however, is that the device 10 drives all the clocks on the PCI bus 16: the device 10 does not receive a PCI clock, but rather is aware of other clocks. Hence, a synchronization conflict could arise if a second device 10' was added that operated in its default mode (e.g., ignoring other clocks on the PCI bus 16 and generating its own PCI clock).

As illustrated in FIG. 3, the use of the PCI host bridge device (DUT) 10 and the control device 10' on the same PCI bus 16 requires that certain operations be performed to ensure no conflict is introduced between the device under test 10 and the control device 10'.

According to the disclosed embodiment, the PCI host bridge (DUT) 10 is implemented on a circuit board (e.g., a motherboard) 302 that includes the processor 102, the memory controller 104, the system memory (DRAM) 118 and the cache memory 120. The circuit board 302 includes a prescribed PCI connector 320 for connection with the PCI bus 16 on the motherboard 302. The PCI bus 16 is illustrated in FIG. 3 as separate from the motherboard 302 solely for ease of illustration.

The control device 10', implemented on a second circuit board 302' having a corresponding connector 320' for connection with the PCI bus 16, is configured to ensure that it is subservient to the device under test 10, enabling testing of PCI-X Mode 2 operations, as well as conventional PCI operations or PCI-X Mode 1 operations. In particular, the control and status registers (CSRS) within the configuration registers 38a are configured as described below, via the PCI bus 16 (or via resistors on the circuit board 302'), with prescribed values that reconfigure the control device 10' in a subservient mode relative to the device under test 10.

In particular, multiple aspects of the control device 10' are modified to ensure that the control device 10' operates in a manner subservient to the device under 10. As described below, the control device 10' is modified relative to clock operations, reset operations, and initialization patterns.

According to the disclosed embodiment, the device under test 10 is configured, as the central resource, for driving the PCI clocks that drive the reset, and the PCI-X specific patterns to identify the mode of operation for the PCI bus 16 (e.g., conventional PCI, PCI-X Mode 1, or PCI-X Mode 2). The control device 10' is configured to operate in phase with the device under test 10; hence, even though the control device 10' outputs signals as if it was a host bridge device, those signals output by the control device 10' are in sync with the signals output by the device under test 10.

Consequently, the simultaneous output of the signals (e.g., clock signals, reset, and initialization patterns) by the host bridge device 10 and the control device 10' appears on the PCI bus 16 as if there exists only one host bridge device, resulting in no adverse effects by the actions of the control device 10'.

Figure 5:
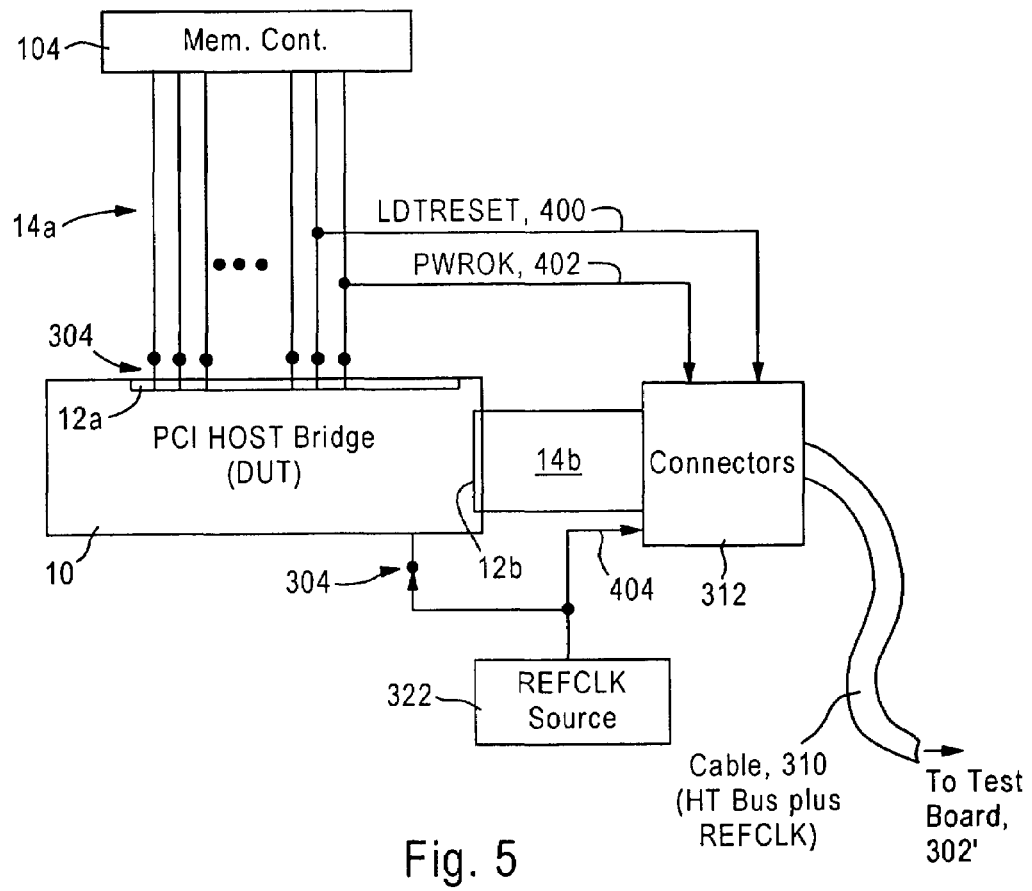
FIG. 5 is a diagram illustrating in detail the shared signals used by the PCI host bridge devices of FIG. 3 for synchronous initialization by the PCI host bridge devices, according to an embodiment of the present invention.

Each of the devices 10 and 10' are synchronously reset based on two prescribed HyperTransport™ link signals, namely Reset (LDTRESET_L) 400 and Power OK (PWROK) 402. As illustrated in FIG. 5, the HyperTransport™ link signals are supplied to the device 10 via the HT bus 14 connected to prescribed pins 304 of the upstream interface 12a of the device 10, and the HyperTransport™ link signals are supplied to the second device 10' via a connector 310 between the devices 10 and 10', the connector cable 310 connected to connectors 312.

The connector cable 310 is implemented, for example, using a ribbon cable configured for carrying multiple signals via connectors 312 installed on the respective boards 302 and 302', each connector 312 having connections to the respective shared pins, including an LDTRESET_L connection 400, a PWROK connection 402, and a REFCLK signal 404.

As illustrated in FIG. 5, the connectors 312 couple the Reset signal (LDTRESET_L) 400 and the Power OK signal (PWROK) 402 from the upstream link 14a to the LDTRESET_L signal line 400 and the PWROK signal line 402 of the downstream link 14b to ensure that the same signals 400 and 402 are asserted on the links 14a and 14b. The connectors 312 also couple the reference clock (REFCLK) 404.

Each device 10 and 10' is configured for receiving the same reference clock (REFCLK) 404. The reference clock 404 preferably is a 200 MHz differential clock signal generated by a local clock generator 322 on the motherboard 302: the reference clock is used to drive the PLL 30 in each of the devices 10 and 10'. The reset logic 36 and the PLL 30 are configured such that the reference clock (REFCLK) must be valid for a minimum of 200 microseconds prior to the rising edge of the PWROK signal. Further, the reference clock (REFCLK) always must be valid while the PWROK signal is in a "high" state.

Hence, in contrast to the HyperTransport™ specification which may allow timing deviations between the Reset and Power OK signals on different HT links in the HT chain, the interconnection of the signals 400 and 402, as well as the clock signal 404, via the connector 312 ensures the same signals 400, 402 and 404 are utilized by the devices 10 and 10' ensuring synchronous reset operations between the two devices 10 and 10'.

In particular, the reset logic 36 in each of the devices 10 and 10' are configured such that the LDTRESET_L and PWROK signals are both required to be low while power planes to the devices 10 and 10' are invalid and for at least 1 millisecond after the power planes are valid. Deassertion of PWROK results in a cold reset by the reset logic 36. After the reset logic 36 detects that the PWROK signal transitions to a "high," state, the LDTRESET_L signal is required to stay low for at least one additional millisecond. After the LDTRESET_L signal transitions to a "high" state at least one millisecond after the PWROK signal transitions to the "high" state, the reset logic 36 executes the prescribed initialization sequence.

After a cold reset, the reset logic 36 can reset the corresponding device 10 or 10' by assertion of LDTRESET_L while PWROK remains high. This procedure, referred to as a warm reset, requires that the LDTRESET_L signal be asserted for no less than 1 millisecond.

Hence, the same reference clock (REFCLK) 404 and the same Power OK (PWROK) signal 402 are supplied to the devices 10 and 10', for example using a connector cable 310 between the respective pins of the devices 10 and 10'. In addition, the reset signal (LDTRESET_L) also is supplied to the devices 10 and 10' using the connector cable 310. Hence, the supply of the reference clock (REFCLK), the Power OK (PWROK) signal, and the reset signal (LDTRESET_L) ensure that the devices 10 and 10' initiate post-reset initialization procedures simultaneously, such that any simultaneous outputs by the devices 10 and 10' on the PCI bus 16 have no adverse effect.

In addition, each device 10 and 10' has a PCI-X frequency capabilities selection input (PCIXCAP) that is set at a prescribed voltage level (PCIXCAP=K). The PCI-X frequency capabilities selection input is implemented in accordance with the PCI-X Protocol Addendum to the PCI Local Bus Specification, Rev 2.0a. In particular, the board 302 includes a resistor (e.g., pull-up or pull-down) 314 having a prescribed value (K1) that causes generation of a first prescribed voltage value for the signal (PCIXCAP) corresponding to the capabilities of the connected device 10 (e.g., PCI-X Mode 2), and the board 302' has a resistor (e.g., pull-up or pull-down) 314' having a second prescribed value (K2) that causes generation of a second prescribed voltage value for the signal (PCIXCAP) corresponding to the capabilities of the connected device 10' (e.g., PCI-X Mode 2, etc.): the insertion of the board 302' into its associated PCI slot electrically connects the resistors 314 and 314' that in combination create a divider network 316 that generates a prescribed voltage level (K), causing the devices 10 and 10' to detect the same prescribed voltage level (PCIXCAP=K) based on the divider network 316 formed by the interconnection of the resistors 314 and 314', ensuring that both devices 10 and 10' establish the same PCI-X frequency capabilities configuration.

Figure 4:
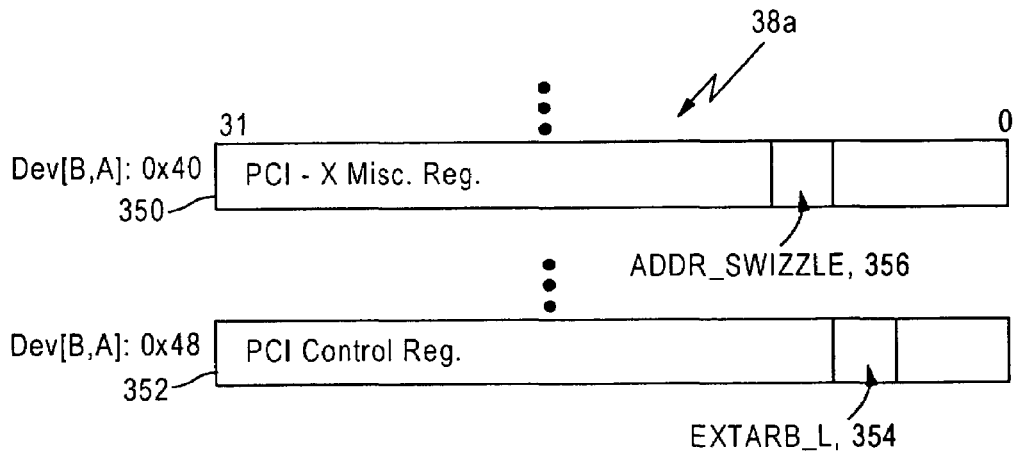
FIG. 4 is a diagram illustrating configuration registers used for configuring the PCI host bridge devices of FIG. 3.

The control device 10' also is configured to ensure that its PCI arbitration modules 42 rely on an external arbiter (namely, the arbitration module 42 within the device under test 10). In particular, FIG. 4 is a diagram illustrating in further detail the configuration register 38a in each of the devices 10 and 10'. The configuration register 38a includes a configuration register (PCI Control Reg.) 352, having a prescribed address "Dev[B,A]:0x48" (the reference "Dev[B, A]" identifies the corresponding bridge (e.g, 18a or 18b), since the CSR registers include registers for each of the bridges 18a and 18b). The configuration register 352 includes an External PCI Arbiter bit (EXTARB_L) 354: setting the bit 354 to "0" (EXTARB_L=0) causes the corresponding arbitration module 42 to defer to an external PCI/PCI-X arbiter; setting the bit to "1" (EXTARB_L=1) activates the corresponding arbitration module 42 for the corresponding PCI bus 16. Hence, the default setting of the External PCI Arbiter bit 354 in the device under test 10 is set to activate the arbitration module 42 (EXTARB_L=1), and the default setting of the External PCI Arbiter bit 354 in the control device 10' is set to cause the corresponding arbitration module 42 to defer to an external arbiter (EXTARB_L=1).

The default settings for the External PCI Arbiter bit (EXTARB_L) 354 are implemented in each of the devices 10 and 10' using respective pin straps 300 and 300' having weak pull resistors for providing detectable values during reset. In particular, prescribed groups of the pins 304 and 304' on the respective devices 10 and 10' will have respective functions during respective operational modes such as normal operation and reset: during reset a prescribed pin 304 on the device 10 or 10' is configured for loading configuration values that are detected based on respective connected weak pull resistors. Weak pull resistors are resistors that provide a detectable value during reset, but which do not affect input data during normal operation. Hence, a weak pull-up resistor will result in a logical "high" (1) value being read on the corresponding pin during reset, whereas a weak pull-down resistor will result in a logical "low" (0) value being read on the corresponding pin during reset. Consequently, weak pull-up and pull-down resistors can be used to implement default configuration settings during reset.

Another aspect of avoiding conflicts between the two devices 10 and 10' involves preventing address mapping conflicts. In particular, the processor 102 and the memory controller 104 are configured for identifying a first address range as belonging to the system memory 118, and a second address range (i.e., memory mapped range) as belonging to the PCI address space for PCI devices connected to the PCI bus 16. Hence, if a request by the processor 102 specifies a destination address outside the first address range belonging to the system memory 118, the memory controller 104 is configured for forwarding the request to the PCI host bridge 10 for output onto the PCI bus 16, for response by a device connected to the PCI bus.

As shown in FIG. 3, both devices 10 and 10' are on the same PCI bus 16. In this case, if the control device 10' is configured for receiving and accepting the destination address specified in the processor-initiated request, the device 10' will receive the processor-initiated request via the PCI bus 16 and bridge the request via its upstream interface to the memory controller 104 via the HT bus 14. In particular, the device 10' outputs the request via its upstream interface (e.g., 12a) onto its upstream tunnel 14; the device 10 receives the request from its downstream interface (e.g., 12b) via its downstream tunnel 14 and forwards the request to its upstream link 14 via its upstream interface (e.g., 12a) for delivery to the memory controller 104. However, the memory controller 104 has already be configured to identify the destination address in the processor-initiated request as a PCI address within the memory mapped range; hence, the memory controller 104 would not respond to the access request.

According to the disclosed embodiment, the configuration register 38a of FIG. 4 includes a control and status register (CSR) 350 for miscellaneous PCI-X operations, including an address invert bit 356 (ADDR_SWIZZLE). In response to the address invert bit 356 being set to "1", the corresponding bridge 18 of the device 10' is configured to modify the address value of any packet received from the PCI bus 16 for delivery upstream via its corresponding upstream interface. For example, in response to the address invert bit 356 being set to "1", the corresponding bridge 18 of the device 10' is configured to invert "bit 30" of the PCI address prior to being output on the upstream interface. As described above, the address invert bit 356 can be set to "1" based on a resistor on the board 302', or the address invert bit 356 can be set by writing to the address (e.g., Dev[B,A]:0x48) of the register 352, where the reference "Dev[B,A]" identifies the corresponding bridge (e.g., 18a or 18b), since the CSR registers include registers for each of the bridges 18a and 18b.

Hence, the device 10 accepts an HT request and forwards the request onto the PCI bus 16, where the device 10 acts as the master of the PCI/PCI-X transaction. The device 10' accepts the transaction, converts the address specified in the request in response to detecting the bit 356 as being set to "1", and outputs the request having the converted address via its upstream interface (e.g., 12a) for delivery to the memory controller 104 via the device 10.

Figure 6:
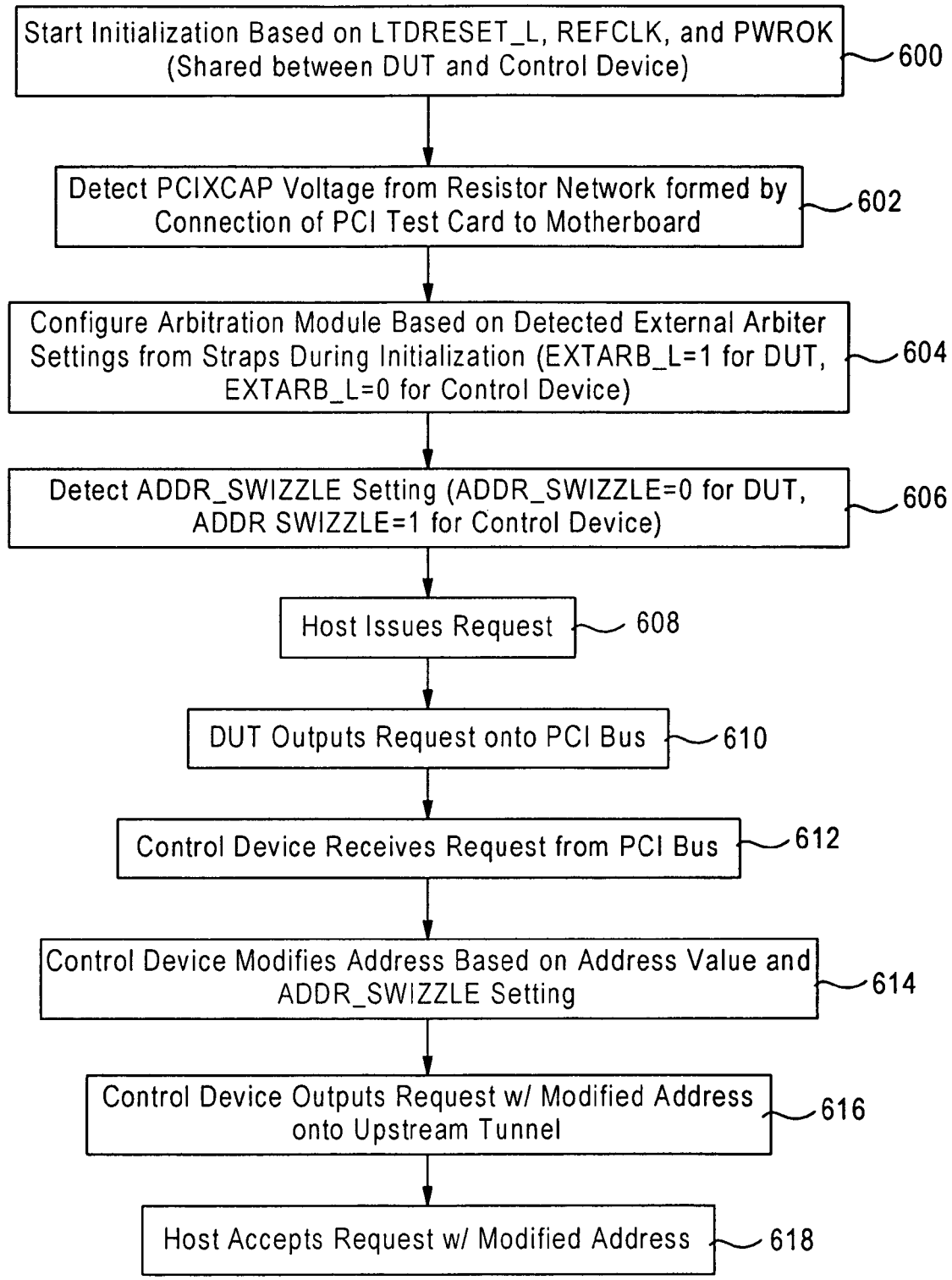
FIG. 6 is a diagram illustrating the method of testing the PCI host bridge device using a second PCI host bridge device according to the configuration of FIG. 3, according to an embodiment of the present invention.

FIG. 6 is a diagram illustrating the method by the devices 10 and 10' for performing conflict-free testing, according to an embodiment of the present invention.

The method begins in step 600, where the reset logic 36 in each of the devices 10 and 10' synchronously initiate initialization of configurations based on the reception of the same signals, namely the LDTRESET signal 400, the PWROK signal 402, and the REFCLK signal 404. The bridge 18 in each of the devices 10 and 10' configure themselves in step 602 to the appropriate PCI-X mode (e.g., PCI, PCI-X Mode 1, or PCI-X Mode 2) in response to detecting the PCIXCAP voltage generated from the resistor network 316. The arbitration module 42 of the device 10' configures itself in step 604 for external arbiter mode in response to detecting the corresponding External Arbiter bit 354 value (EXTARB_L=0) based on the corresponding strap resistor 300'. The arbitration module 42 of the device 10 configures itself in step 604 for internal arbiter mode in response to detecting the corresponding External Arbiter bit 354 value (EXTARB_L=1) based on the corresponding strap resistor 300.

After power-up, a software resource executed by the processor 102 (e.g., driver software) can be used to set in step 606 the address invert bit 356 at the register address "DevB:0x40[ADDR_SWIZZLE-=1]" for the device 1Q (DUT) and the address invert bit 356 at the register address "DevB:0x40[ADDR_SWIZZLE=0]" for the device 10' (Control Device) to ensure the device 10' inverts the address value for upstream data.

In this example, assume there is host memory at the address range 0x0–0x0FFF_FFFF. The DUT 10 is configured for prefetchable memory at 0x4000_0000–0x40FF_FFFF. The control device 10' is configured for no prefetchable memory.

The host processor 102 issues in step 608 a request to address 0x4000_0100. The DUT 10 accepts the request via its upstream link (e.g., 14a in FIG. 5) and forwards the request in step 610 to PCI/PCI-X bus 16.

The Control Device 10' receives in step 612 the request from the PCI bus 16 via its internal PCI interface 40. The bridge 18 determines that the destination address 0x4000_0100 is destined for its upstream tunnel 14, and in response to its address invert bit 356 being set for inverting the address, the bridge 18 of the Control Device 10' inverts in step 614 the address bit at location "30", resulting in the modified address 0x0000_0100. The bridge 18 of the Control Device 10' forwards the request in step 616 onto the upstream HyperTransport™ tunnel 14 specifying the address 0x0000_0100. The DUT 10 tunnels the request with the modified address to the memory controller 104. The host processor 102 and the memory controller 104 accept in step 618 the request because the specified address is within its memory range for the host processor 102.

According to the disclosed embodiment, PCI based host bridges can be tested by connecting a duplicate host bridge, and configuring the duplicate host bridge to reset synchronously with the host bridge under test, and to be subservient to the host bridge under test to avoid bus conflicts or memory conflicts.

It will be readily apparent that the signal and register names are by way of illustration only, and that various modifications may be implemented consistent with the scope of the claims.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an integrated PCI bridge device coupled to a PCI bus, the method comprising:
   initiating configurations in the integrated PCI bridge device, synchronously with a second integrated PCI bridge device coupled to the PCI bus, based on signals electrically connected between the integrated PCI bridge device and the second integrated PCI bridge device, the signals electrically connected including a shared clock signal;
   receiving a data transaction from the PCI bus, based on PCI bus arbitration performed by the second integrated PCI bridge device;
   modifying a destination address specified in the data transaction to a modified address; and
   outputting the data transaction having the modified address to the second integrated PCI bridge device via a link distinct from the PCI bus.

2. The method of claim 1, wherein the outputting step includes outputting the data transaction via a first HyperTransport™ link as the link distinct from the PCI bus.

3. The method of claim 2, wherein the second integrated PCI bridge device is coupled to a memory controller via a second HyperTransport™ link, the initiating step beginning in response to the signals electrically connected including first and second signals each coupled to the first and second HyperTransport™ links.

4. The method of claim 3, wherein the first and second signals are reset and Power OK signals, respectively.

5. The method of claim 1, wherein the receiving step includes configuring the integrated PCI bridge device to rely on bus arbitration performed by the second integrated PCI device by setting a prescribed configuration bit.

6. The method of claim 1, wherein the modifying step includes modifying the destination address from a prescribed memory mapped address range used for accessing the PCI bus, to the modified address within a prescribed host memory address range.

7. The method of claim 1, wherein the initiating configuration step includes selecting PCI protocol having been selected based on having detected a shared PCI configuration signal.

8. A system comprising:
   a first integrated PCI bridge device configured for outputting data, having been received from a host via an upstream link according to a prescribed link protocol, onto a PCI bus according to a PCI protocol having been selected based on having detected a shared PCI configuration signal, and based on a shared clock signal;
   a connector cable configured for supplying a second link and the shared clock signal; and
   a second integrated PCI bridge device configured for receiving the second link according to the prescribed link protocol and the shared clock signal from the connector cable and configured for receiving the data from the PCI bus according to the PCI protocol, the second integrated PCI bridge device having selected the PCI protocol based on having detected the shared PCI configuration signal, the second integrated PCI bridge device further configured to rely on PCI bus arbitration performed by the first integrated PCI bridge device;
   wherein the first and second integrated PCI bridge devices are configured for synchronously initiating respective configurations based on the shared clock signal, and signals electrically connected between the upstream link and the second link.

9. The system of claim 8, wherein the second integrated PCI bridge device includes a configuration register having an address modification bit, the second integrated PCI bridge device configured for modifying a destination address specified in the data received from the PCI bus to a modified address, and outputting the data with the modified address, onto the second link based on the address modification bit being set to a prescribed value.

10. The system of claim 9, wherein the first and second PCI bridge devices each are configured for executing HyperTransport™ operations as the prescribed link protocol.

11. The system of claim 10, wherein the signals electrically connected between the upstream link and the second link include a reset signal and a Power OK signal.

12. The system of claim 9 wherein the second integrated PCI bridge device includes a second configuration register having an external arbiter bit, the second integrated PCI bridge device having a PCI arbitration module configured for relying on the PCI bus arbitration performed by the first integrated PCI bridge device in response to the external arbiter bit being set to a prescribed value.

13. The system of claim 12, wherein the second integrated PCI bridge device includes reset logic configured for detecting, during a prescribed reset interval, the prescribed value of the external arbiter bit in response to detecting a prescribed voltage induced by a connected resistor, the prescribed reset interval initiated by the synchronous initiating of the configurations based on the shared clock signal and the signals electrically connected between the upstream link and the second link.

14. The system of claim 9, wherein the second integrated PCI bridge device is configured for modifying the destination address from within a prescribed memory mapped address range used for accessing the PCI bus, to the modified address within a prescribed host memory address range used by the host.

* * * * *